US 3,708,557
Patented Jan. 2, 1973

3,708,557
PHOSPHORUS ACID ESTERS AND METHOD FOR COMBATTING INSECTS THEREWITH
Kazuhiko Ando and Teiji Omino, Yasu-machi, Yasu-gun, and Kennosuke Imamura, Tokyo, Japan, assignors to Sankyo Company Limited and Nippon Chemical Industrial Company Limited, both of Tokyo, Japan
No Drawing. Filed Mar. 26, 1969, Ser. No. 810,790
Int. Cl. A01n 9/36; C07f 9/08
U.S. Cl. 260—940    1 Claim

ABSTRACT OF THE DISCLOSURE

Dialkyl phosphates having the formula

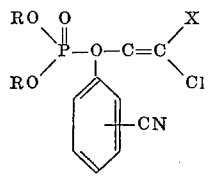

wherein R is a lower alkyl group, preferably of 1 or 2 carbon atoms and X is hydrogen atom or chlorine atom. These phosphates are useful as an insecticide against various harmful insects such as mosquitos, flies, aphids, rice borers, cutworms, spider mites and the like and applied in the form of agricultural insecticidal preparation such as dusts, granules, liquids, wettable powders, emulsions and the like.

---

This invention relates to new organic phosphorus compounds and their use as an insecticide.

More particularly, it relates to a new class of an organic phosphorus compound having the formula

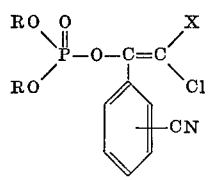

(I)

wherein R is a lower alkyl group and X is hydrogen atom or chlorine atom. Also, it relates to a new use of the above-specified phosphate (I) as an insecticide against various harmful insects.

In the above Formula I, the alkyl group R may be straight or branched and of 1 to 5 carbon atoms; e.g. methyl, ethyl, n-propyl, isopropyl, n-butyl, tert.-butyl, n-pentyl and the like, preferably methyl or ethyl.

The cyano group in the phenyl ring may take any position, preferably p-position, to the ring carbon atom attached to the vinyl moiety.

Heretofore, a large number of organic phosphorus compounds of many types have been synthesized and evaluated for insecticidal activities and many organic phosphorus compounds are now commercially available as an insecticide, including parathion, methyl parathion, E.P.N. (Registered Trademark, O-ethyl O-p-nitrophenyl-phenylphosphonothioate), malathion, diazinon and the like.

Such prior insecticidal phosphorus compounds have, however, some shortcomings to be improved, for example, high toxicity to human beings and other warm-blooded animals and so on. Thus, many attempts are now being made in the art to develop much more effective insecticidal phosphorus compounds with less toxicity.

As a result of our extensive investigations on the preparation of various organic phosphorus compounds and the insecticidal activity thereof, it has been found that a new type of the organic phosphorus compounds of the above Formula I is successfully synthesized and they exhibit exceptionally high insecticidal activity against harmful insects and low toxicity to warm-blooded animals, as compared with prior analogous phosphorus compounds.

It is, accordingly, an object of this invention to provide new organic phosphorus compounds of the above Formula I which are highly effective for controlling harmful insects.

It is another object of this invention to provide a new method for controlling harmful insects which comprises applying the new phosphorus compound of the above Formula I to said insects.

Still another object of this invention is to provide an insecticidal composition which comprises as an active ingredient the new phosphorus compound of the above Formula I and an agriculturally-acceptable carrier.

These and other objects of this invention will become apparent from the following description.

The new organic phosphorus compound I of this invention may be easily prepared by reacting a trialkyl phosphite having the formula $$(RO)_3P \qquad (II)$$

wherein R is as defined above with an acetophenone compound having the formula

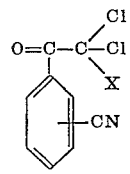

(III)

wherein X is as defined above.

In the production of the organic phosphorus compounds of the Formula I as set forth above, the reaction may be suitably conducted in an inert organic solvent such as aromatic hydrocarbons, e.g. benzene, toluene, xylenes and the like. Preferred embodiment in this production may be carried out by dropwise adding the trialkyl phosphite (II) to a solution of the acetophenone compound (III) in a suitable inert organic solvent while stirring and maintaining at a low temperature that is room temperature or lower, preferably less than 20° C.; preferably maintaining at that temperature for about 30 minutes to about 1.5 hours, and then gradually raising the reaction temperature to about 80–130° C.; and maintaining the reaction mixture at that temperature for approximately 2–3 hours.

this reaction at chemical equivalents, slight excess of the trialkyl phosphite to the acetophenone compound is preferably employed and more preferably molar ratio of the trialkyl phosphite to the acetophenone compound is about 1.0–1.3:1.

After completion of the reaction, the reaction product may be recovered from the reaction mixture by a conventional method. For instance, the reaction product may be recovered from the reaction mixture by removing the solvent and fractions having low boiling point through distillation under reduced pressure and, if desired, the product thus obtained may be further purified, for example, by recrystallization from a suitable organic solvent.

The preferred group of the organic phosphorus compounds of the above Formula I according to this invention may be represented by the following formula

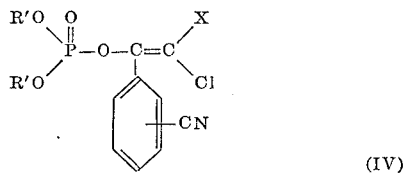

(IV)

wherein R' is methyl or ethyl and X is as defined above.

And, illustrative of still more preferred group of the organic phosphorus compounds (IV) according to this invention are as follows:

O,O-dimethyl O-[1-(p-cyanophenyl)-2-chlorovinyl] phosphate,
O,O-diethyl O-[1-(p-canyophenyl)-2-chlorovinyl] phosphate,
O,O-dimethyl O-[1-(p-cyanophenyl)-2,2-dichlorovinyl]phosphate, and
O,O-diethyl O-[1-(p-cyanophenyl)-2,2-dichlorovinyl] phosphate.

In another aspect of this invention, there are provided a method for controlling harmful insects which comprises contacting said insects with an insecticidally effective amount of the organic phosphorus compound of the above Formula I and also an insecticidal composition which comprises as an active ingredient the organic phosphorus compound of the above Formula I and an agriculturally-acceptable carrier.

The active compound (I) used according to this invention may be conveniently formulated by a known procedure and employed in various forms including liquids, dusts, granules and wettable powders etc.

Liquids may be prepared by dissolving the active compound in an agriculturally-acceptable liquid carrier, i.e. a suitable solvent with or without one or more of known adjuvants commonly employed in the art such as emulsifying agents, wetting agents, or dispersing agents. Suitable solvents include water, alcohols such as methanol or ethanol, acetone, benzene, toluene, xylenes, solvent naphtha, petroleum ether, the mixture thereof and the like. Suitable adjuvants may be any of those which is ordinarily employed in the art, and include, for example, the condensation products of alkylene oxides with phenols or organic acids, alkylarylsulfonates, dialkyl sulfosuccinate, polyoxyethylene ether or ester derivatives of alalcohols or acids and the like.

Dusts and granules may be prepared by mixing said active compound in and on an inert agriculturally-acceptable solid carrier by a conventional procedure. Suitable solid carriers for use in this invention include, for example, talc, pyrophylite, kieselguhr, clay, bentonite, diatomaceous earth, kaolin, precipitated chalk and the like.

Wettable powders may be prepared by mixing said active compound with one or more of the aforementioned solid carriers and suitable dispersing agents. Suitable dispersing agents include, for examples, those aforementioned adjuvants such as alkylbenzenesulfonates, lignosulfonates or polyoxyalkylene glycol ethers or esters.

The concentration of the active compound in the composition of this invention may normally be from about 0.1 to about 95% by weight, and preferably from about 0.5 to about 70% by weight, based upon the total weight of the composition, although the amount of the active ingredient employed will largely depend upon such factors as the degree of insect damage, the form of a composition or the specific active compound, toxicity of the active compound and the like. It should be, however, understood that the amount of an active compound employed is not a critical feature of this invention. Two or more of said active ingredients may be conveniently incorporated into the agricultural insecticidal composition of this invention.

The agricultural insecticidal composition of this invention may also include other known insecticidal agents, e.g. benzenehexachloride, 1,1,1-trichloro - 2,2 - bis(p-chlorophenyl)ethane, O,O - dimethyl S - (N-methylcarbamoylmethyl)phosphorodithioate, O,O-diethyl S-2-(ethylthio) ethyl phosphorodithioate and the like; fungicidal agents e.g. phenylmercurychloride, kasugamycin, ferric methylarsonate, N-trichloromethylthio-4-cyclohexane - 1,2 - dicarboxyimide, and the like; fertilizers, and the like. However, it is not desirable to incorporate a known agent, which is of alkaline nature in itself, into the insecticidal composition of this invention together with the active compound (I), since the latter active ingredient tends to decompose.

The method for controlling harmful insects of this invention comprises contacting said insects with an insecticidally effective amount of the active compound (I). This active compound is, of course, to be applied in such an amount sufficient to exert the desired insecticidal effect, usually in a concentration of about 5 p.p.m. or higher for liquid preparations, e.g. liquids and diluted wettable powders and in a dose rate of about 7–50 g. of the active compound per 10 ares for solid preparations, e.g. dusts and granules.

The active compound (I) of this invention has been found to be highly effective for controlling various harmful insects, e.g. mosquitos, flies, rice borers, rice leafhoppers, rice maggots, planthoppers, aphids, mites, cutworms, spider mites and the like.

In order to illustrate the excellent insecticidal activity of the organic phosphorus compound (I) according to this invention, the comparative testings and the results therefrom are given hereinbelow:

EXPERIMENT 1

Comparative test for insecticidal effect on azuki bean weevil (*Callosobruchus chinensis*)

The newly emerged male adults of weevils were employed for the test within 24 hours after the emergence. The test compound as indicated below was formulated into a 10% wettable powder, which was then diluted with water to the concentrations of the active ingredient as indicated below.

Fifty weevils per one test plot were dipped into said suspension at 20° C. for 10 seconds and kept in a petri dish at 25° C. Mortality (percent) was observed and calculated after 24 hours of the treatment. The results are summarized in the following Table I.

The test compounds employed throughout the experiments will be frequently referred to as follows:

Compound A: O,O-dimethyl O-[1-(p-cyanophenyl)-2-chlorovinyl]phosphate.
Compound B: O,O-diethyl O-[1-(p-cyanophenyl)-2-chlorovinyl]phosphate.
Compound C: O,O-dimethyl O-[1-(p-cyanophenyl)-2,2-dichlorovinyl]phosphate.
Compound D: O,O-diethyl O-[1-cyanophenyl)-2,2-dichlorovinyl]phosphate.
Compound E (control): O,O-diethyl O-[1-(2,5-dichlorophenyl)-2,2-dichlorovinyl]phosphate.

TABLE I

[Mortality (percent)]

| Test compound | Concentration of the test compound | |
|---|---|---|
| | 50 p.p.m. | 5 p.p.m. |
| Compound: | | |
| A | 100 | 60 |
| B | 100 | 45 |
| C | 100 | 100 |
| D | 100 | 92 |
| E (control) | 90 | 21 |

EXPERIMENT 2

Comparative test for insecticidal effect on tobacco cutworm (*Prodenia litura*)

The fourth instar larvae of cutworms were used for the test.

The test compound as indicated below was formulated and diluted as described in the Experiment 1.

Fifty cutworms per one test plot were dipped into said suspension at 20° C. for 30 seconds and kept in a petri dish at 25° C. Mortality (percent) was observed and calculated after 24 hours of the treatment.

The results are summarized in the following Table II.

TABLE II

| | [Mortality (percent)] | |
|---|---|---|
| | Concentration of the test compound | |
| Test compound | 50 p.p.m. | 5 p.p.m. |
| Compound: | | |
| A | 95 | 37 |
| B | 88 | 29 |
| C | 100 | 64 |
| D | 100 | 55 |
| E (control) | 48 | 10 |

EXPERIMENT 3

Comparative test for insecticidal effect on turnip aphid (*Lipaphis pseudobrassicae*)

Aphids living on leaves of Japanese radish were employed for the test.

The test compound as indicated below was formulated and diluted as described in the Experiment 1.

The aphids were dipped into said suspension for 30 seconds together with the host plant, air-dried and then kept at 25° C. in a glass cylinder wherein the host plant was put into a small bottle with cotton plug containing water. Mortality (percent) was observed and calculated after 24 hours of the treatment.

The results are summarized in the following Table III.

TABLE III

| | [Mortality (percent)] | |
|---|---|---|
| | Concentration of the test compound | |
| Test compound | 50 p.p.m. | 5 p.p.m. |
| Compound: | | |
| A | 100 | 49 |
| B | 100 | 64 |
| C | 100 | 100 |
| D | 100 | 100 |
| E (control) | 100 | 30 |

EXPERIMENT 4

Comparative test for killing effect on two-spotted spider mite (*Tetranychus urticae*)

The spider mite adults were employed for the test.

The test compound as indicated below was formulated and diluted as described in the Experiment 1.

The leaves of string bean bearing many aphid adults were dipped into said suspension for 10 seconds, air-dried and then kept at 25° C. in a petri dish. Mortality (percent) was observed and calculated after 24 hours of the treatment.

The results are summarized in the following Table IV.

TABLE IV

| | [Mortality (percent)] | |
|---|---|---|
| | Concentration of the test compound | |
| Test compound | 50 p.p.m. | 5 p.p.m. |
| Compound: | | |
| A | 93 | 68 |
| B | 88 | 50 |
| C | 100 | 86 |
| D | 100 | 70 |
| E (control) | 79 | 31 |

EXPERIMENT 5

Comparative field test for insecticidal effect on rice stem borer (*Chilo suppressalis*)

Host plant: rice plant (Yamabiko)

Date of rice planting: June 18, 1968.

Treatment: The test compound as indicated hereinbelow was formulated into a 50% emulsifiable concentrate which was then diluted with water to a 1000 times volume. The diluted emulsion thus obtained was sprayed on a test plot twice on the 4th and 12th of July, 1968 at the rate of 100 l. per 10 ares.

Observation: On the 29th of July, 1968, the total numbers of the observed stem, of the stem with damaged sheath and of the stem with damaged pith were counted for 50 stocks randomly selected from test plot. The total number of damaged stem was calculated from that of the stem with damaged sheath plus that of the stem with damaged pith and damage degree (percent) was calculated from the total number of the above observed stem and from that of the above damaged stem.

Results: The results are summarized in the following Table V.

TABLE V

| Test compound | Total number of stem observed | Total number of stem with damaged sheath | Total number of stem with damaged pith | Total number of damaged stem | Damage degree (percent) |
|---|---|---|---|---|---|
| Compound: | | | | | |
| A | 1,132 | 10.0 | 5.0 | 15.0 | 1.3 |
| B | 1,103 | 16.0 | 11.0 | 27.0 | 2.4 |
| C | 1,158 | 5.3 | 1.0 | 6.3 | 0.5 |
| D | 1,093 | 7.7 | 3.0 | 10.7 | 1.0 |
| Non-treated | 1,053 | 42.0 | 49.0 | 91.0 | 8.6 |

It will be apparent from the above Tables I to V that the organic phosphorus compounds (I) of this invention exhibit an exceptionally high degree of insecticidal activity against various harmful insects, as compared with known analogous insecticidal agent.

The following examples are given only for the purpose of further illustrating of this invention. They should not be construed to be limiting the scope of this invention.

Examples 1 to 4 will describe the production of the preferred organic phosphorus compounds (I) of this invention and Examples 5 to 7 will show some preferred embodiments of the insecticidal composition according to this invention. All parts are given by weight unless otherwise stated.

EXAMPLE 1

O,O-dimethyl O-[1-(p-cyanophenyl)-2-chlorovinyl]phosphate

To a solution of 18.2 g. of 2,2-dichloro-p-cyanoacetophenone in 60 ml. of toluene was added 12.6 g. of trimethyl phosphite at a temperature below 20° C. over a 45 minutes period. The resulting mixture was maintained at room temperature for 90 minutes. Then, the reaction temperature was gradually raised to 105–110° C. by heating, and heating at that temperature was continued for additional 60 minutes.

After completion of the reaction, the reaction mixture was concentrated under reduced pressure, whereupon 12.5 g. of crystalline substance separated in situ. The crude substance thus separated was recovered by filtration and recrystallized from a mixture of ether with petroleum ether to give the desired product as white crystals melting at 90–92° C.

*Analysis.*—Calc. (percent): P, 10.77; Cl, 12.33. Found (percent): P, 10.71; Cl, 12.31.

EXAMPLE 2

O,O-diethyl O-[1-(p-cyanophenyl)-2-chlorovinyl]phosphate

To a solution of 18.2 g. of 2,2-dichloro-p-cyanoacetophenone in 50 ml. of benzene was added 16.9 g. of triethyl phosphite at a temperature below 20° C. with stirring. The resulting mixture was stirred at room temperature for 50 minutes and then heated under reflux.

After completion of the reaction, the reaction mixture was concentrated under reduced pressure to give 26.5 g. of the desired product as a red liquid showing a specific rotation of $D_n^{25}=1.5323$.

*Analysis.*—Calc. (percent): P, 9.81; Cl, 11.23. Found (percent): P, 9.80; Cl, 11.04.

EXAMPLE 3

O,O-dimethyl O-[1-(p-cyanophenyl)-2,2-dichlorovinyl] phosphate

To a solution of 22.4 g. of 2,2,2-trichloro p-cyanoacetophenone in 50 ml. of toluene was adde d13.4 g. of trimethyl phosphite at a temperature below 20° C. with stirring over a 80 minutes period. After completion of the addition, the reaction mixture was stirred at room temperature for a while and then heated at 85–90° C. for 120 minutes.

After completion of the reaction, the reaction mixture was concentrated under reduced pressure to separate 29.7 g. of crystalline substihhc cewnaa9
g. of crystalline substance which was then recrystallized from a mixture of ether and n-hexane to give the desired product as brown crystals melting at 45–47° C.

*Analysis.*—Calc. (percent): P, 9.96; Cl, 22.01. Found (percent): P, 9.75; Cl, 21.85.

EXAMPLE 4

O,O-diethyl O-[1-(p-cyanophenyl)-2,2-dichlorovinyl] phosphate

To a solution of 22.4 g. of 2,2,2-trichloro-p-cyanoacetophenone in 50 ml. of toluene was added 19.5 g. of triethyl phosphite over a 60 minutes period while stirring and maintaining at a temperature below 10° C. The resulting mixture was stirred at room temperature for 30 minutes and then heated at 95–100° C. for additional 60 minutes. After completion of the reaction, the reaction mixture was concentrated under reduced pressure to give 31.5 g. of the crude desired product as a dark brown liquid showing a specific rotation of $D_n^{25}=1.5319$. After crystallization and recrystallization from a mixture of ether with n-hexane, there was given the pure desired product as pale yellow plates melting at 48–49° C.

*Analysis.*—Calc. (percent): P, 8.85; Cl, 20.25. Found (percent): P, 8.90; Cl, 20.25.

EXAMPLE 5

Dust

Three parts of O,O-diethyl O-[1-(p-cyanophenyl)-2-chlorovinyl]phosphate was adsorbed on 5 parts of diatomaceous earth and the resulting material was thoroughly mixed and uniformly pulverized with 92 parts of talc to make a dust.

EXAMPLE 6

Wettable powder

Twenty parts of O,O-diethyl O-[1-(p-cyanophenyl)-2,2-dichlorovinyl]phosphate was adsorbed on 20 parts of diatomaceous earth and the resulting material was thoroughly mixed and uniformly pulverized with 7 parts of polyoxyethylene nonylphenyl ether and 3 parts of polyvinyl alcohol to make a wettable powder.

EXAMPLE 7

Emulsifiable concentrate

Fifty parts of O,O-dimethyl O-[1-(p-cyanophenyl)-2,2-dichlorovinyl]phosphate was dissolved in 30 parts of acetone-benzene-ethanol and thereto was added and admixed 20 parts of "Newcol" (Registered Trademark, an emulsifying agent manufactured and sold by Nihon Nyukazai K.K., Japan) to make an emulsifiable concentrate.

What is claimed is:
1. A compound selected from the group consisting of

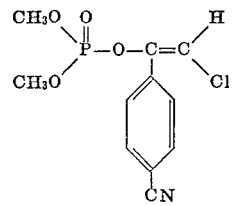

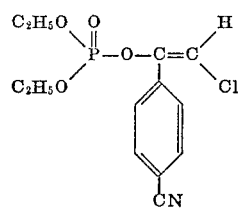

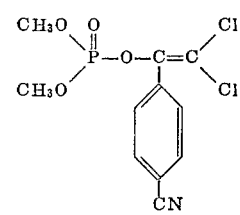

and

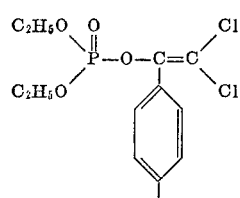

References Cited

UNITED STATES PATENTS 3,116,201  12/1963  Whetstone et al. ___ 260—957 X

FOREIGN PATENTS 783,697  9/1957  Great Britain _____ 260—957

LEWIS GOTTS, Primary Examiner

R. L. RAYMOND, Assistant Examiner

U.S. Cl. X.R.

260—969; 424—210

UNITED STATES PATENT OFFICE
CERTIFICATE OF CORRECTION

Patent No. 3,708,557        Dated January 2, 1973

Inventor(s) Kazuhiko ANDO, Teiji OMINO and Kennosuke IMAMURA

It is certified that error appears in the above-identified patent and that said Letters Patent are hereby corrected as shown below:

In the heading of the patent, insert:

--Claims priority, application Japan,

April 3, 1968, 43-21976--

Signed and sealed this 29th day of May 1973.

(SEAL)
Attest:

EDWARD M. FLETCHER, JR.         ROBERT GOTTSCHALK
Attesting Officer              Commissioner of Patents